United States Patent [19]

Antoine et al.

[11] 4,045,661

[45] Aug. 30, 1977

[54] APPARATUS FOR DETECTING AND PROCESSING ERRORS

[75] Inventors: Pierre Gabriel Antoine, Palaiseau; Jean-Claude Marcel Cassonnet, Conflans-Ste-Honorine; Daniel Rene Vinot, Villepreux, all of France

[73] Assignee: Compagnie Honeywell Bull (Societe Anonyme), Paris, France

[21] Appl. No.: 570,743

[22] Filed: Apr. 23, 1975

[30] Foreign Application Priority Data

Apr. 25, 1974 France .................................. 74.14488

[51] Int. Cl.² ........................................... G06F 11/06
[52] U.S. Cl. ....................... 235/153 AC; 235/153 AK
[58] Field of Search ................. 235/153 AC, 153 AK; 340/172.5

[56] References Cited

U.S. PATENT DOCUMENTS 3,533,065  10/1970  McGilvray et al. .............. 340/172.5

OTHER PUBLICATIONS

McCracken, D. D. et al., Numerical Methods and Fortran Programming, N. Y., John Wiley and Sons, Inc., 1964, pp. 2-3.

Primary Examiner—R. Stephen Dildine, Jr.
Attorney, Agent, or Firm—Cameron, Kerkam, Sutton, Stowell & Stowell

[57] ABSTRACT

The disclosure describes apparatus for handling detected errors in a data processing system. First means define and locate the detected errors and second means allow the attempted reexecution of the instruction being executed when the error is detected.

3 Claims, 9 Drawing Figures

CONTROL MASK REGISTER

AMF = COUNT MECHANISM
ASR = AUTOMATIC STORE RECONFIGURATION
CE  = CORRECTED ERROR
ET  = ENVIRONMENT TOLERANCE
HG  = HARDWARE GATE

ME  = MACHINE ERROR
RHU = RESERVED FOR HARDWARE US
RS  = RETRY SUCCESSFUL

APPARATUS FOR DETECTING AND PROCESSING ERRORS

BACKGROUND AND SUMMARY OF THE INVENTION

The present invention has as an object an apparatus for handling errors in the central processor of a program-controlled data-processing system. When an error occurs, the purpose of the apparatus is either to correct it or to formulate messages which are transmitted to the software or to the persons responsible for the maintenance of the system. Although the reliability of components used in data-processing systems is particularly high and although every care is taken when wiring or fabricating the components, it may still happen that errors occur, even in the best equipment. Statistics show that they mainly originate from weaknesses in certain of the very many connections which are required.

Manufacturers very quickly become aware of the necessity for dealing with the errors which might occur in the course of processing and have already fitted data-processing systems with detecting and correcting devices which, for the most part, make use of data redundancy.

An early method consists in adding a parity bit to the useful data. In the computer field, where the probability of random errors is very low, a self-checking code termed a parity code is often used which has M + 1 bits of which the first M bits are used to code 2M significant data items. The M + 1th bit, termed the parity bit, is set in such a way that the total number of bits in the 1 state is an even number (even parity code) or an odd number (odd parity code). This code is only partly self-checking since it does not permit double errors to be detected (two wrong bits in the same data item for example). In a particular system which employs the invention and operates on the basis of a data octet, the code adopted is an odd parity code. This results in the simultaneous transmission of eight data bits, one parity bit, and a bit for validating the parity checking register. Effectively, in particular when the system is initialized, since the register for the parity bit is empty, the machine would immediately report an error if this precaution were not taken. The present invention uses this method to detect errors.

A second method consists in using more elaborate codes termed error auto-correction codes. In a particular system which employs the invention, the central memory uses autocorrection codes. However, in what follows, the discussion will be confined to how errors detected by the central processor are dealt with by the use of parity bits. The manner of detecting the error is not the purpose of the apparatus, which only acts after the error has been detected. The errors which are capable of occurring in a data-processing system may result either from poor programming, in which case the errors are "software" errors, or from a temporary or long term fault in one of the machine components, in which case the errors concerned are said to be hardware or machine errors. The invention concerns chiefly, but not exclusively, the latter type of error.

Until now, when an error was detected, the machine interrupted the program and immediately warned the supervisor software which accepted the handling of the error, possibly with the assistance of the programmer. Of course, in the case of intermittent faults, repeating an instruction often allows the error to be corrected. In the present invention, hardware means and specialized microprograms allow the error to be located, the current process to be interrupted, and the error to be dealt with directly, recourse being had to the software only in certain special cases. In particular, the mechanism relieves the software and also allows performance to be improved.

The purpose of the present invention is an apparatus which allows an instruction to be retried or repeated when an error has been detected, that is to say the instruction can be retried until the error is corrected. After a certain number of unsuccessful tries, the apparatus informs the software of the existence of a semi-permanent error.

In the present invention, the error handling apparatus for a multiprogrammed system in which the software creates processes which are either in execution, the ready state, the waiting state, or in the suspended state, with the system containing at least one central processor and at least one central memory connected to the said processor, is characterised in that it includes registers which store the characteristics of the error detected and which enable retry operations to be performed, the outcome of these operations being reported to a block of specialized microprograms which may possible call up a central exception mechanism, which itself interrogates the software.

DESCRIPTION OF THE DRAWINGS

Other features and advantages of the preferred embodiment of the invention will become apparent from the following description, which refers to the FIGURES. in which.

DESCRIPTION OF THE PREFERRED EMBODIMENT

Figure 1:
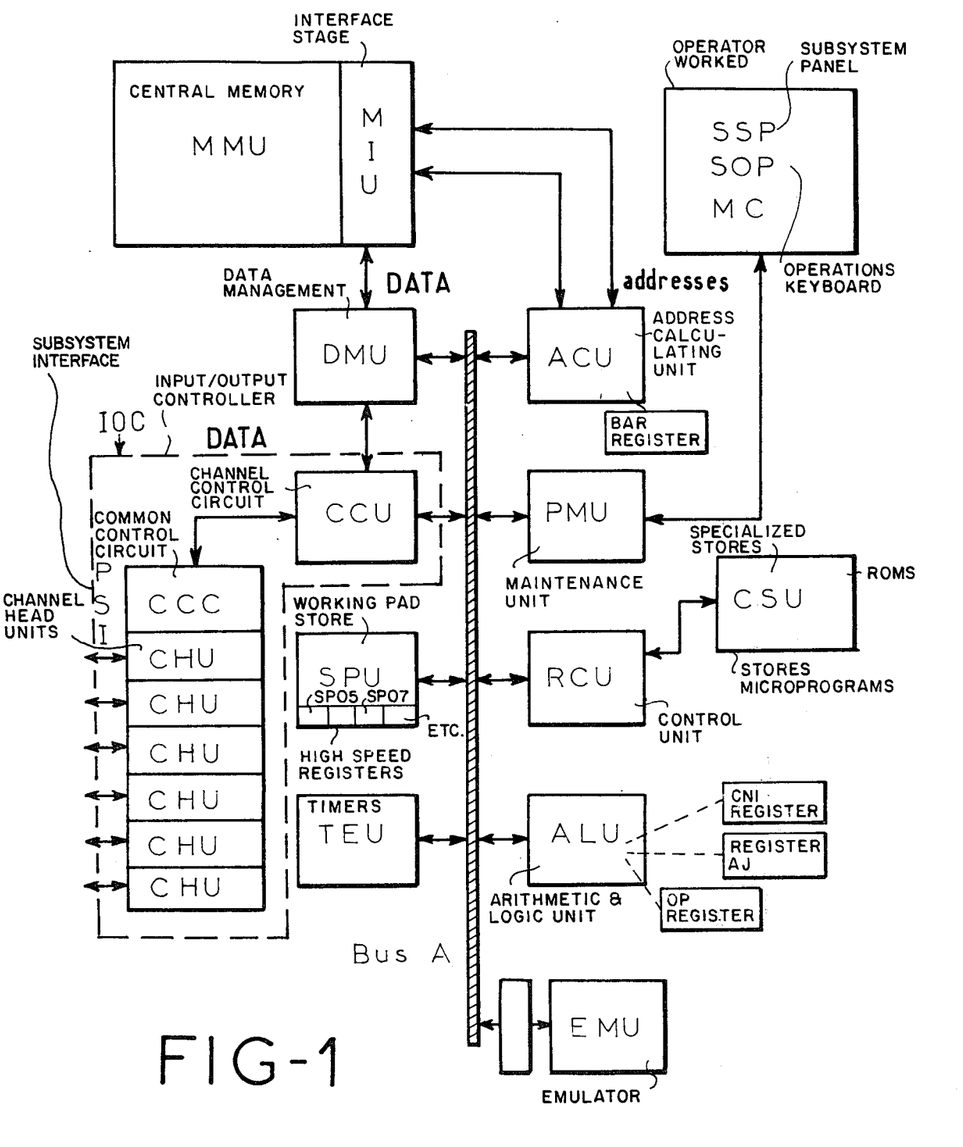
FIG. 1 is a block diagram of the operational units of the central processor.

In FIG. 1 are shown the various logic units of an exemplary central processor such as a Honeywell Series 60, Level 64, Model 20 or an IBM 360 Model 25. Although it does not form part of the processor, the central memory MMU has been shown. It is connected to the processor by an interface stage MIU. Interface MIU is linked on the one hand to a data management stage DMU and on the other to an address calculating stage ACU. Data reaches stage DMU via a channel control unit CCU which is itself linked to a peripheral sub-system interface PSI via channel head units CHU whose operation is synchronized by a common control circuit CCC. The units ACU, CCU and CHU are, per se, well-known in the art, as disclosed in U.S. patent application Ser. No. 470,430, filed Sept. 3, 1974, and entitled "Segmented Address Development." In the example shown in FIG. 1, there are six physical channels, each of which has a channel head. The central processor also contains operational units which are linked together by means of a main line termed BUS A which gives the various units the opportunity of dialoguing with one another. The working or scratch pad store SPU is formed by a series of very high speed registers which, in the course of operations, allow certain data which will be used again subsequently to be saved or put aside. The microinstructions are, in the main, contained in one or more specialized stores CSU which may be formed by read-only memory elements. The CSU stores contain, inter alia, the blocks of microprograms for the system controller which controls the operations of the system. The microprograms contained in CSU stores are called up and transmitted under the control of the control unit RCU for the specialized stores. The maintenance unit PMU allows the operator to control and monitor what is happening in the machine. The operator is able to affect the operations of the machine by means of a peripheral sub-system panel SSP, an operations keyboard SOP or a maintenance channel MC. The central processor also includes a unit TEU for synchronizing operations as a whole which contains the timers required. The arithmetic and logic unit ALU is the processor's calculating unit which processes data and reconstitutes them. It may be replaced, at least partially and temporarily, by an emulation unit EMU, in certain instances. The arithmetic and logic unit is, per se, well-known in the art, as shown in U.S. Pat. Nos. 3,201,762; 3,238,508; 3,404,387; and 3,400,371. The emulation unit EMU also is well-known in the art, per se, as incorporated into IBM's System 370, and disclosed in "Computer Organization and the System 370", by Harry Katzan, published in 1971 by the Reinhold Company, pp. 265 et seq.

A microinstruction word, containing 32 bits for example, may act simultaneously on several stages or units. As an example, a microinstruction word may possess the following structure:

ACU denotes a microinstruction which acts on the address calculating unit ACU in the main store, and so on. The BRANCH microinstruction indicates the place where this microinstruction word should be addressed.

In the terminology which has been adopted, microinstructions relating to the ALU are termed "family 3" microinstructions. By means of switching, the microinstructions for the emulation unit EMU may be substituted for microinstructions of the arithmetic unit ALU. However, as will be seen below, when there is any hardware extension, the ALU may be disconnected to be replaced by an emulation unit.

The visibility of the central processing unit to a program is termed the "interior decor" of the CPU. This functional specification (interior decor) describes the data formats, instruction formats, instruction functions, data registers, command entries, input/output operations, and other functional characteristics of the central processor.

The number DEXT of the decor in which a process is to be executed is contained in a process control block PCB, as described in U.S. patent application Ser. No. 528,951, entitled "System Base". At the start of a new process execution, the central processor examines the decor number and interprets the instructions on the basis of this number.

Figure 2:
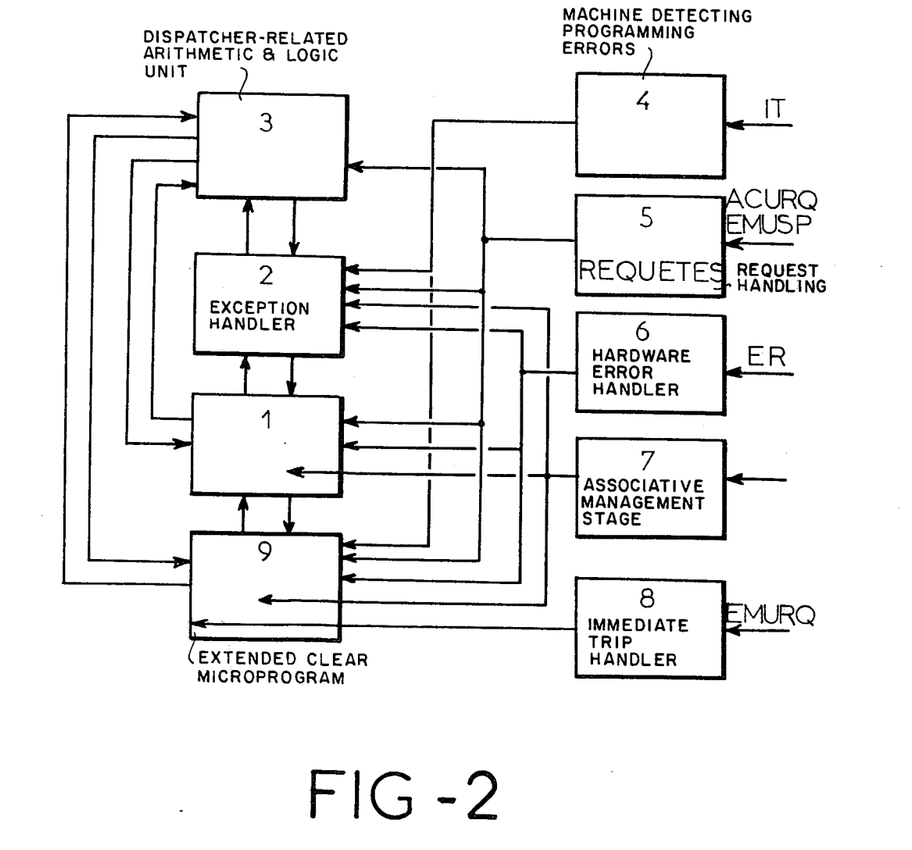
FIG. 2 is a diagram of the organization of the service microprograms.

In FIG. 2, which shows the blocks of microprograms making up the control system, the native mode microinstruction stage 1 contains native mode microinstructions, the purpose of which is to execute software instructions written in native language.

The purpose of the execution handling stage 2 is to act upon exceptions which occur in the course of processing and to inform the software of them.

The distribution stage or dispatcher 3 allows processes to change over to different states, being the execution waiting, suspended and ready states.

Normally, in a microsoftware block, when the block has been called in, the microinstruction are run sequentially, i.e., when one microinstruction has been completed, the next in the block is executed in its turn. Unfortunately, a certain number of external or internal events may interrupt this operation. There is then either an interruption or a trap operation. In a trap operation, the microprogram leaves the microinstruction which it is executing at the conclusion of this instruction and branches to another point of the microprogram and starts on a new sequence. In an interruption, the microprogram returns to the point from which it departed as soon as the event responsible for the interruption is no longer in evidence. Although the difference between a trap and an interruption is a slight one, it can be said in broad terms that a trap is linked to a certain type of operation, whereas an interruption is asynchronous with the running of the microprogram.

The process alert handling stage 4.

This is called in the event of the machine detecting programming errors such as: access under register BAR located in the address calculating stage ACU, as shown in FIG. 1, read, write, or execute violations, exceeding the physical limits of the memory, exceeding segment limits, or illegal content in a base register. The BAR register is well-known in the art, as shown by U.S. patent application Ser. No. 528,951.

The process alert handler-4 calls in the exception handler 2 in all cases except if a trap takes place with an extended decor microprogram. In this latter case, the process alert handler again calls in the extended decor microprogram 9.

The request handling stage 5 allows demands or requests generated by asynchronous events or events external to the running of the program to be processed. It takes control in the event of an ACURQ request, when the clocks are up-dated (TMURQ), and in the handling of "alert" messages, intermediate and terminal messages in data input and output operations, and operating requests PMURQ from the maintenance panel.

The action taken by the request stage may result in:
a switch to a new process (in some cases of input/output messages);
a system exception;
a return to the next instruction in the program in the course of execution;
a process exception.

The hardware error handler 6 is called up when an error which is not related to the program occurs. It analyses flip-flops to find out whether a retry can be made, as will be described below.

The management stage 7 for the associative memory.

Its function is to copy segment descriptors into the associative memory, up-date the segment descriptors and manage the associative memory.

The immediate trap handler 8 is called up by the emulation unit when the EMURQ signal from the maintenance panel unit goes to 1 (EMURQ) is an interface signal originating from the emulation unit EMU). In all cases handler 8 calls up a decor extension 9.

Block 9 is a block of extended decor microinstructions.

Of the microsoftware elements whose functions have just been briefly described, the majority do not process instructions directly. They carry out service tasks and form what will subsequently be referred to as the control system of the processor. This applies in particular to the exception handling stage 2, the dispatcher 3, the process alert handling stage 4, the request handling stage 5, the machine or hardware error handling stage 6, the associative memory management stage 7 and the immediate trap handling stage 8.

The control system so defined is written in native mode microinstructions. It may however operate either in the native mode or in an extended mode.

If a machine error is detected by the hardware of one of the elements of the data-processing system, the machine error mechanism is implemented. The action taken by the machine error mechanism as a result of its being implemented depends on the setting of bits ME and RS in the hardware control mask which is shown at 208 in FIG. 6. Also, its action will vary depending on whether or not the operation can be retried and, when it can, on the success or failure of the retry.

The manner in which central processor errors and main memory errors are acted upon is disclosed in the following. The main memory detects errors in the data transferred from or to the central processor, doing so by means of redundant bits. Although the main memory corrects certain errors automatically, where the error cannot be corrected it causes the central processor to report the appropriate category of machine exception.

In the event of an error in the central processor CPU or an error in the main memory MMU, a two-stage operation is implemented. In the first phase of the operation, attempts are made to eliminate the error (a retry in the case of processor exceptions or the employment of error correcting codes) and in the second phase, the results of each attempt are reported to the central exception mechanism under the control of data contained in the hardware control register 208. It should be noted that a distinction is made between an error and an exception since an error may generate the exception which is subsequently reported to the central exception mechanism. Thus, once the machine error has been detected and the machine error mechanism has acted on it, an exception may be reported to the central exception mechanism.

Figure 3:
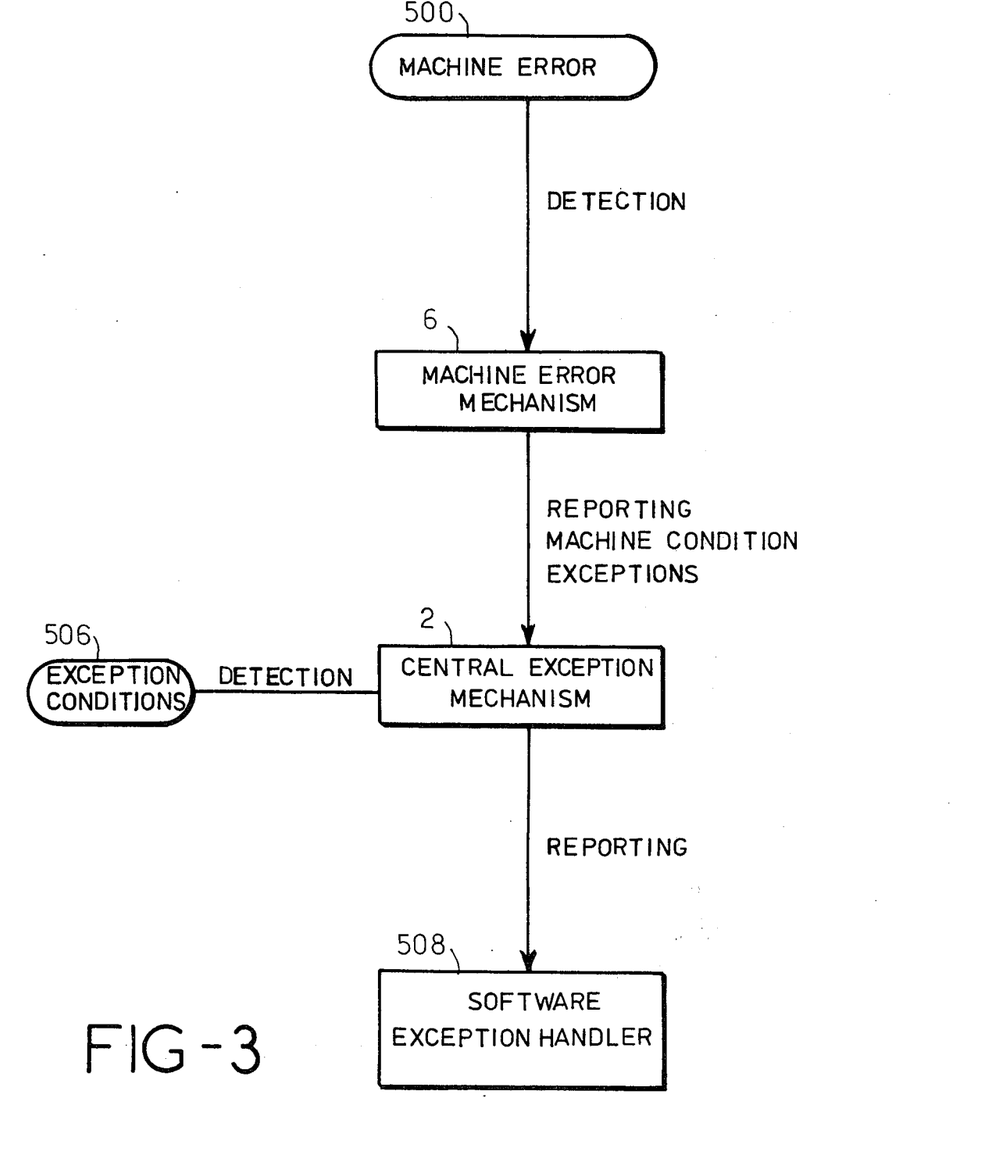
FIG. 3 is a flow-chart of the way in which the errors are retrieved and processed.

FIG. 3 is a general diagram of the error handling process. When an error is detected at 500, by means of parity bits, the microsoftware block 6 for handling hardware errors is called up. The microprogram concerned undertakes a number of operations which will be described later and, if it does not succeed in correcting the error, it generates an "exception" and calls up the exception handler 2 which formulates a message intended to cause the exception to be handled by the supervisor software. Exceptions generated following an unsuccessful attempt at error handling constitute only one type of exception and the other types are represented by 506.

The diagnosis of anomalies is undertaken by the different elements of the data-processing system.

In the case of a machine error, a machine error mechanism is advised of the existence of the error. After having tried to put the error right, the machine error mechanism reports the results of any attempted action on its part to a central exception mechanism under the control of data contained in the machine control mask 208.

As was seen above, the central processor carries out a sequence of data operations while the other parts of the system are carrying out sequences of operations of their own. Although operations will normally be executed in the proper way, this is not always the case. Thus, it is possible for an error or exception to occur in one of the parts of the system, including the central processor, which will require special action to be taken.

As shown in FIG. 3, a machine error 500 may be detected. By a machine or hardware error is meant the occurrence of an internal event which compels the microprogrammed hardware of the system to at once stop the system operating for reasons attributable to the detection of its incorrect operation. Thus a machine error may be an error in the main memory MMU, or an error in the central processor CPU which is detected by means of the parity checking system, and so on. Machine errors are dealt with by the machine error mechanism 6 which is able to advise the central exception mechanism on the basis of the results of its own action.

In all other cases, the central exception mechanism 2 is brought into action directly as shown at 506. The exceptions at 506 comprise all other exceptions which are detected while the system is executing instructions or control operations. Thus, if during normal operation, the data-processing system detects the occurrence of an alert or error in an element, it is able to break off operations and execute an exception. This exception is equivalent to the process of acting on errors reported to the central exception mechanism.

The way in which the central exception mechanism operates is conditioned by the state of the central processor at the moment when the exception occurs. Thus, at a given moment, the central processor may be either (1) executing an instruction on behalf of a certain process or (2) carrying out an internal operation. Consequently, the two chief types of operations are:

1. operations relating to instructions, which are in all cases executed on behalf of the running process, the central processor CPU being in the process mode or the critical transitory mode, and 2. system control operations, which are carried out when the central processor is in the system mode or the critical transitory mode.

Having acted on the exception, the central exception mechanism 2 sends a signal to an exception handling program 508 containing data on the circumstances which gave rise to the exception. These circumstances are reported either in the process mode or the system mode by means of either a trap mechanism or an interruption. In either case an exception report is made which contains a message which identifies the error and constitutes a full description of the moment at which the error was detected.

As mentioned above, the central processor may be in one of three possible modes when an exception is detected. When a process has control of the central processor and the last instruction executed on behalf of the current process is as yet uncompleted at the time when the exception is detected, the central processor is said to be in the process mode. When the central processor is not in the course of executing an instruction but is carrying out a system control operation, it is then in the system mode at the time when the exception is detected. It should be noted that it is not necessarily a process which has control of the central processor at this time. If a process is controlling the central processor, it is not affected by the exception and it will logically be able to resume its own execution at its own next instruction. If an exception is detected at a point where it is possible that data involving the overall status of the system may be destroyed, such being the case with, for example, exceptions encountered when the machine is manipulating process and message queues, the central processor is then said to be in the critical transitory mode. This is indicated by locking a hardware gate HG (FIG. 6) before carrying out any function the nature of which requires that the sequence of operations forming it should not be interrupted. The detection of an exception by the central exception mechanism gives rise to a system alert when the system is in the critical transitory mode.

The fact that the central processor is in the machine error state has no bearing on the operation of the central exception mechanism. Given that each of the three modes listed above is independent of the others, the central exception mechanism acts as dictated by these modes and handles exceptions accordingly.

The operation of the central exception mechanism.

When an exception has been reported to the central exception mechanism, an exception is said to have occurred. This state arises in the event of alerts or errors.

When an exception is detected, a register AJ illustrated in FIG. 1 as being in the arithmetic and logic unit ALU receives an 8 bit code and a branch is made. This branch will be made to a special address for any exception which validates the central exception mechanism 2.

When it takes over control of the central processor, the central exception mechanism 2 carries out the following operations: First of all it tests whether the hardware gate HG (FIG. 6) is locked. If this hardware gate is at 1, or in other words if it is locked, this means that the central processor was in the critical transitory mode. Consequently, an exception which occurs while the hardware gate is locked causes the central processor to go over to the system alert state. When the "system alert" state arises, the diagnostic processes proper to the type of system are carried out. This occurs because the central processor cannot be interrupted and otherwise the system would continue to carry out its operations with faulty elements and would behave defectively until an exception was detected at a later stage.

Normally, the hardware gate is not locked and the next operation is one of fetching the value which was loaded into register AJ when the exception was detected and accessing the main or central memory. Above the BAR register located in the address calculating stage ACU, the main memory has an area number which appears in register AJ and an exception, which consists of a class number and a type number, will be read from the table. The class number identifies the group to which the exception belongs and the type number identifies the particular exception within the group. These details will be transferred to a particular address in the auxiliary store SPU.

In the case of an exception which results from a machine error being reported, the class and type numbers give the nature of the error other than a machine error, the class and type define the nature of the relationship between the attempted operation and the element or elements which it involved.

Given that there are approximately 80 exceptions which can be detected by the data-processing system, an 8 bit number is generated at the outset in register AJ. Register AJ is a working register situated in the arithmetic and logic unit ALU. This number then indexes the main-memory exception table, and this produces a 16 bit number. These 16 bits consist of 8 bits for the class number and 8 bits for the type number, thus providing full identification for the exception. This number will identify the software whether the exception concerned is a functional one or an illegal one (see U.S. patent application Ser. No. 528,955, entitled "Apparatus and Method for Handling Exceptions in a Data-Processing System" which was filed in the name of the present Applicants).

Figure 5:
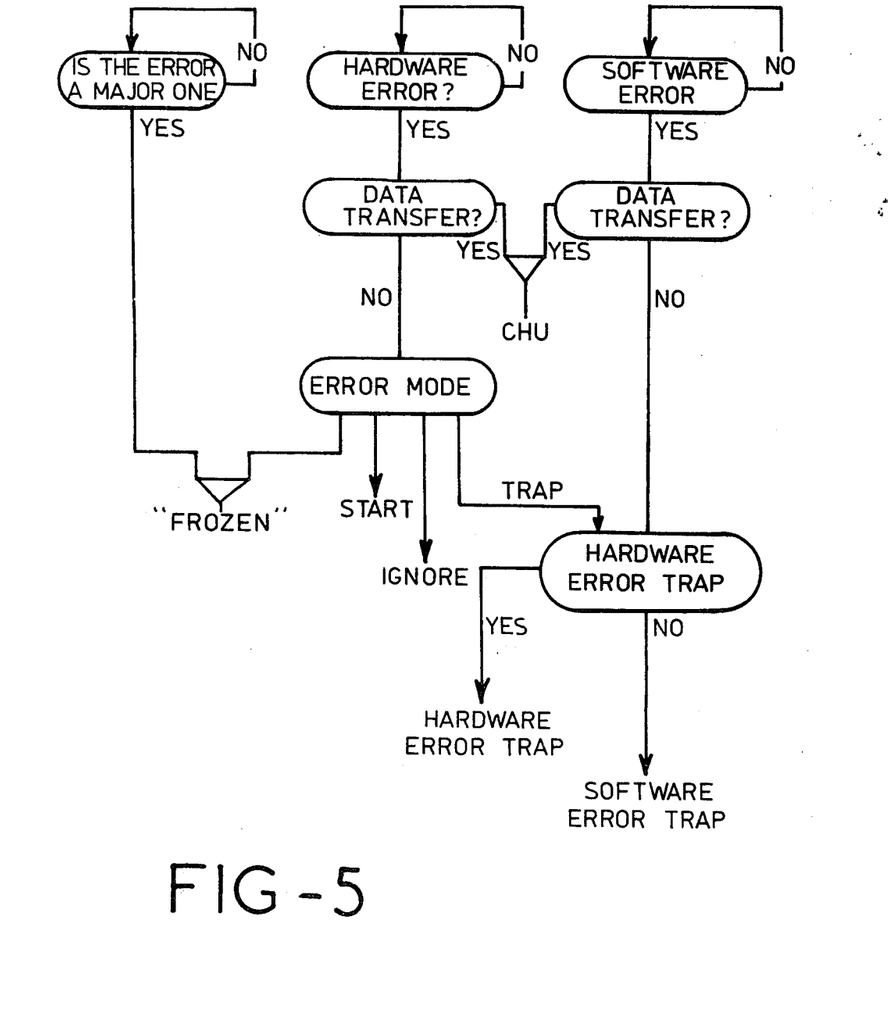
FIG. 5 is a diagram of the different types of errors and the way in which they are handled by the machine.

FIG. 5 is a general diagram of the errors which may occur and of the action which is taken by the central processor in each instance. If the reply to the question "Is the error a major one?" is YES, the processor is "frozen", that is to say all its operations are halted and the central processor calls on a diagnostic processor, such as that described in U.S. patent application Ser. No. 502,118 for an "Apparatus for Testing and Diagnosing a Data-Processing Unit" which was filed by the present applicants.

The diagnostic processor identifies the failure and reports it to the maintenance staff.

Under certain conditions, the central processor CPU may be "frozen" as a result of a minor error; when what is involved is not a data transfer in which the error may be attributed to a channel unit CHU. In this case, the other actions taken by the processor may be:
to call up isolated test routines (ITR), which is shown in FIG. 5 by the arrow marked START,
the processor may ignore the error and continue processing,
the processor may call up a trap procedure, which may be a machine or hardware error trap or a software error trap as the case may be.

At all stages there are hardware means for checking data by using data redundancy, these means being located both in the data input/output controller and in the data-processing circuits of the central processor.

The principles adopted are the following:
data transfers are checked if the transfer is 8 octets wide (and in certain cases where the width is less);
data transfers are checked at the terminal register stage (at the last buffer store for the data concerned). There is no systematic test for intermediate transfers;
transfers of addresses (such as central memory addresses) are checked by means of parity check bits;
function code transfer addresses are not normally checked, while the codes themselves are never checked.

In effect, it is assumed that an error of this type will be manifest from the nature of the results and will show up as:
a duplication;

data which are illegal in the context, such as an illegal decimal format;

an address under BAR.

In what follows three kinds of error will be distinguished:
- major errors;
- minor errors;
- software errors.

A major error is an error which makes it necessary to reset the whole central processor to zero. A minor error is an error which produces a reaction against the error mode which has been selected (at the sub-system panel or in the maintenance channel). A software error is an error which originates from the program. The errors are stored in different registers depending upon the type of error (classes and sub-classes).

As soon as a register is not unoccupied, it is locked to prevent it from storing other errors. The completion of the instruction which was started resets the register to zero and then unlocks it. Subsequently, the error detection circuits are non-operational during one or more cycles.

Figure 7:
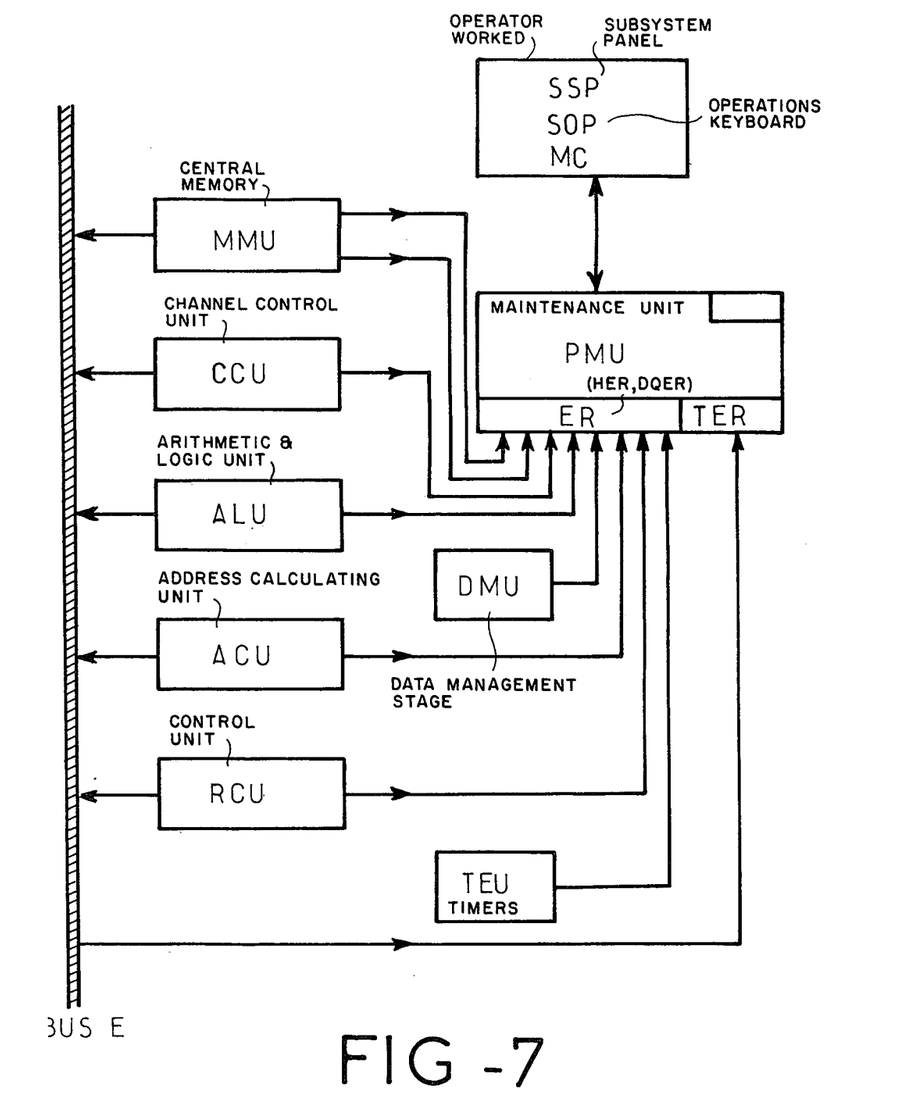
FIG. 7 illustrates the way in which the error bus and the error registers are connected.

Major errors and minor errors which do not occur during an input/output transfer are stored in a register termed ER, as shown in FIG. 7. Minor errors which occur in the course of a data transfer are stored in the HER and DQER registers having the same location and configuration as the ER register, as illustrated in FIG. 7. Software errors are stored in a register IT in the case of level 4 or in a bistable SO in the case of other levels.

The place of storage depends on the class of error and the error mode interrogated. FIG. 5 is a flow-chart for the various eventualities encountered in handling errors.

In the case of hardware or software errors which occur during a data input/output transfer, the handling process is as follows:

In the case of software errors and certain hardware errors (those where it is certain that only the IOC transfer has been upset) the HER flag in the channel head appropriate to the erroneous transfer is set to 1 at the end of the sequence. The effect of this HER flag will be to inhibit the next memory input cycle by acting on a mask. A distinct flag in the channel head appropriate to the erroneous transfer is set to 1 if and only if the data transfer has not been completed.

In the course of operation, when a hardware error signal emitted by one of the parts of the central processor goes to binary 1, it is stored in a location of the error register ER which is shown in FIG. 7. The location in the register corresponds to the operational stage which emitted the signal. Then, on the basis of the state of the maintenance circuits, the fact that the error register is no longer unoccupied leads to:
- a trap request (TRAP) being generated;
- an isolated test routine request being generated (ITR);
- the central processor being frozen (FREEZE) or else it has no effect on the functioning of the system (IGNORE).

When a software error signal does not occur in the course of a data transfer, the memory input cycles are inhibited in the following manner:
1. a write violation (level 4 and the segmented mode); a mask is prepared,
2. in the case of segment overflow, an abort signal inhibits the write cycle.

As soon as a software error is detected on level 1 or 3 or when data is being linked, a bistable (not shown) goes to binary 1 in order to mask the other IOC levels and to generate a trap request when the current job has been completed (synchronization is provided by the microprogram). In the system which is being used to describe the invention, the IOC is integrated. That is, the function of controlling data inputs and outputs is performed by the CHU's, the common stage CCC, the channel control unit CCU and special registers for the name located in DMU and ACU.

The errors detected are:
- access under BAR;
- exceeding the physical memory.

As soon as a software error is detected on level 4, it is stored in appropriate registers, not shown.

When an error occurs, two procedures are executed simultaneously:
- the microprogram;
- a hardware procedure intended to prepare a trap request.

Consequently, when the trap takes place, it is necessary to find out what the microprogram has already executed, that is to say what level it was working on. (In a computer to which the invention is applied, operations are divided up into priority levels: levels 0 to 3 correspond to jobs carried out for the system itself and level 4 to the jobs called for by the user programs). Unfortunately, this information is not available. The consequences to the handling operation depend on the level on which the microprogram was operating. If the level for the current microprogram was other than level 4, microprograms up to level 4 are considered to have been upset. However, whatever the current level of execution may be, a job on another level may have been completed immediately before the trap. It is necessary to know what in fact has happened in order to inform the microprogram concerned of this.

A microprogram on the level $i$ other than 4 may carry out operations relating to a level $j$ higher than $i$.

Consequently, when a trap takes place on level $i$, the following need to be informed by the microprogram of this disturbance:
- the current job on level $i$;
- the level $j$ job which has been trapped (interrupted by level $i$);
- the level $k$ job which has been trapped;
- the level 4 job which has been interrupted.

The informative operations above consist in preparing a flag in the channel head CHU, the pointer for which is located in a register bank.

When the change of level occurs immediately before a trap caused by a hardware error, the mechanism based on register bank CN$i$ illustrated in FIG. 1 as being located in an arithmetic and logic unit ALU would be adequate if the trap had begun immediately after the error was detected. This is not what happens and so allowance has to be made for changes of level.

When an error occurs in the logic circuits of the processor, a further register OP illustrated in FIG. 1 as being located in the arithmetic and logic unit is loaded. Register OP is well-known in the art as shown in U.S. Pat. Nos. 3,400,371; 3,404,378; 3,238,508; and 3,201,762. An OP error signal occurs which requests a trap. The trap requesting bistable is set to binary 1.

When an error occurs in the course of a cycle of the central memory, an MMU error signal goes to binary 1 and is fed into error register ER (locations 5 and 7).

Broadly speaking, during the delay which exists between the time at which the microcommand is wrongly executed and the trap requesting bistable is set, one or two microprogram words are executed and if the trap request appears immediately after the end of the level, the error may involve the level which is ending, this corresponding to a channel head unit CHU which is not necessarily present in CN$i$ if the level of execution is the same as before. In this case the action taken is to carry out the ABORT instruction on all the IOC operations and then on the data-processing job.

The number of cycles which take place after the end of a microprogram on level $i \neq 4$ and before the trap requesting bistable is set, is given by a register. This register is reset to zero at the end of a microprogram on level $i \neq 4$. Particularly is register ER is unoccupied, it moves up as follows:

$$00 \to 10 \to 11 \to 11 \to 11 \ldots$$

The state of this register 1 indicates whether the error occurred at the end of the microprogram or while the microprogram was being executed.

The state of this bistable is analyzed by a special microprogram block which will be described below. The circuits are designed to allow instructions to be retried when executing them for the first time fails to give satisfactory results. To this end, the circuits include a retry bistable RTY which is set and read by the microprograms. RTY indicates whether the instruction in course of execution has destroyed the information required for a retry. Since the error is only detected after a certain period of time and since RTY is set only at the beginning of each instruction, there is a possibility of mis-interpretation. It is therefore necessary to provide a second bistable BGI to indicate that a change of instruction has just taken place.

If a hardware error is detected, one of the following actions is undertaken by the processor:

ITR (isolated test routine). If a microprogram belongs to the tests, a trap request is made. If this is not the case, the processor is initialized and the execution of the microprogram begins at address zero.

FREEZE: the clocks of the processor are stopped immediately.

IGNORE: no notice is taken of the error (it is stored in the error register ER).

The error handling function calls for an internal reaction by the processor each time a hardware error is detected. There are four classes of error:
MJER: major processor errors
CPER: minor processor errors
MMER: memory errors
CHER: errors relating to channels The identity of the operational unit which has detected the error is stored in error register ER (or in the case of a channel error in a register for IOC errors) and a detailed status for the error is contained in a register TER for the type of error. Registers ER and TER are shown in FIG. 7. Like the control mask in FIG. 6 they belong to the operational unit PMU. FIG. 7 shows how these two registers are connected to the other operational units. Units such as DMU and TEU do not need to be connected to the error bus since if there is an error in these units it will always be the same one.

The reaction by the processor depends on the position of the error mode selector and a switch switches the error at the sub-system panel (or its simulation by a maintenance channel or by the content of the maintenance register MR).

When the switch is in the "error selection" position, errors in the CPU and the IOC have the same effect.

The handling of the errors is undertaken by a microprogram block which will be termed the hardware error handler HEH 6 (FIG. 2). The error handler 6 comes into action whenever a hardware error occurs. The identifying data for these errors is fed into register ER. That is to say, each time register ER contains other than zero bits, a microprogram branch is made to the special microprogram HEH 6.

The function of this handler is to determine what the consequence of the error shall be. It may decide on:
1. a system check, if:
no program or microprogram has yet been loaded;
or a level is masked (i.e., if a bit in register MK is at binary 1).
2. an exception, if:
either CMI is at 1 (system mode),
or the instruction in course of execution cannot be retried,
or the retry count has reached its maximum value,
or the capability octet of the process in course of execution is illegal.
3. a retry of the current operation if this is feasible. The operation concerned may be:
the current instruction,
the part of the dispatcher which allows the registers for a new process NJP to be reset from its own PCB. (This operation is looked upon as a part of the first instruction in executing NJP).
4. a return to the emulator, if the operation can be retired and if the process was being executed in an extended decor mode.

The error handler is contained in two different microprogram segments A1 and A3 in the specialized store CSU. The handler may be called in by any microprogram level whatever.

Segment A1 has two parts:
a. six lines, beginning at address 4FO, which carry out the following functions:
setting (MD) 0 to binary 1 and resetting (MD) 3 to 0 (ALU mode),
reserving certain registers for later use
resetting register IT (software)
checking whether the microprogram has been loaded into the central memory. If it has, data stored in register (SP 05) 7 branches the microprogram to segment A3 and if not (Sp 05) 7 freezes the system. (SP 05) 7 indicates a storage location within the working store SPU as shown in FIG. 1, i.e. the bit number 7 of the register 05 of the SPU. The SPU is well-known in the art as illustrated by U.S. Pat. Nos. 3,248,709 and 3,351,509.
b. three lines for resetting the error register and setting the machine to the error state.

Segment A3, which is located in the central memory analyses the state of the system.

In the case of errors detected by the IOC, a special microprogram resident in A3 is made use of once it has been fetched. (This information is given by testing (SP 05) 7, which is a register in working store SPU).

Registers and bistables are used by the error handler. The registers SP OX, X being 5, 8, A, etc. concerned belong to the working store SPU which is formed by a high speed, low capacity store.
SP 08 contains RTY, BGI, LVS and CLV
SP 09 contains MRB, MR, TER, ER
SP OA contains GT, EG, ILV, CG, IM SP OB contains STR, ECC SP OC contains the appropriate address.

All this data is fed into the working store at the beginning of an operation by the hardware error handler.

SP 14 contains a flag which enables the site of the error to be identified. 02 is a central memory error, and 03 a central processor error.

SP 18 contains a parameter which may possibly be used by the exception handling microprograms. (SP 055) 0:8 indicates whether or not a microprogram has been loaded into the central memory.

SP 13 contains the address of the process control block controlling the process in the course of execution or the address of an IOC message.

Other registers may also be used.

1. RTY is set to 1 when data is written into the central memory or into SPU. It may be set to 1 by microinstruction SRY and reset to zero by EOP. If RTY is at 1, the instruction cannot be retried.
2. BGI is used to mark the beginning of an instruction. It is set to 1 by microinstruction EOP and reset to zero one cycle later if ER is at zero.

It is used to prevent a retry if a hardware error occurs before EOP and is detected after it since the instruction counter IC is pointing to the next instruction after that in the course of which the error occurred.

If BGI is one, an exception termed a "retry impossible" exception is generated.

LVS is a two-bit register used to mark the beginning of a job level. CLV is the current level and ILV the level interrupted.

A hardware error is not detected as soon as it occurs. A few microprogram cycles intervene between the appearance of an error and its detection.

A change of level may occur between the appearance of an error and its detection. When this is the case, the identity of the level on which the level occurred is lost.

The number of the corresponding physical channel is of no significance. Register LVS is used to identify this state of affairs. The current level is stored in CLV (4 bits) with the following meanings:

0000 level 4
0001 level 3
0010 level 2
0100 level 1

The level interrupted is recorded in ILV using the same code as above.

Registers ER and TER identify the errors (FIG. 7). Register ER is a 16 bit register. On the basis of the bit which is set to 1, it is possible to find the nature of the error:

1 indicates time overrun during an initialization test,
2, that the ITR limits have been exceeded,
3, a parity error in the mode register. These errors are major central unit errors,
4, is always at zero
5, a memory error
6 is set to 1 if all the operations have been reset (unstable case)
7, general memory error
8, ALU error
9, DMU error
10, ACU error
11, PMU error
12, RCU error
13, TEU error
14, CCU error
15, instruction outside the time allowed.

These last errors are minor ones.

The error is a memory error if bits 5 or 7 are at logic 1 and at this moment the other positions and bits have no significance. The nature of the error is recorded in STR (central memory status register) which is not shown.

In the case of a hardware error, the microprogram trap occurs in a line of segment A1. As soon as register ER has been loaded, all traps and interruptions are masked by the machine. The microprograms need to withdraw these masks as soon as possible.

A certain amount of time must be allowed between the moment at which register Er is reset to zero and that at which the traps are unmasked. In practice, a length of time equivalent to 6 cycles has been adopted.

When the machine is in the error state, EXST = 1 and the machine is inhibited as soon as register ER is not unoccupied.

The "Reset Error" microinstruction is used to empty register ER. At the same time the parity of register BAR is reset to zero. Reading register BAR thus gives rise to an error. To prevent this, the BAR value needs to be read from the central memory and fed to a parity check register, and then the latter fed into boundary address register BAR.

Analysis of the status of the processing machine.

The following operations are carried out:
the BAR value is read and entered into the BAR register located in the address calculating stage ACU as indicated in FIG. 1:
the presence of software in the central memory is tested for:
if software has been loaded into the central memory, certain registers and bistables are checked.

The time counter for the process is stopped. It may be started again on instruction from the exception handler 2, the dispatcher 3, or the request handler (FIG. 2). If bits 5 and 7 in register ER are at zero, the error originates from the CPU. The location of the error (CPU/MS) is recorded in working store SPU (SP 14) and, if the error cannot be retried, SP 14 has 02 fed to it in the case of a central memory error and 03 in the case of a processor error.

In all cases register ER is transcribed into the central memory at address (44) and into the working store SPU.

When a hardware error has been detected it is possible to retry the instruction at least in certain instances.

This operation is controlled by an indicator contained in the process control block which allows the retries to be initiated.

Another indicator is the retry limit. There is a limit in each instruction beyond which it is impossible for the instruction to be retried since the fact of the instruction being executed has altered the data which could have been used to carry it out again.

This mechanism is also controlled by a retry counter. It functions in three stages:
a first retry round (the number of retries is the same as the content of the counter. There is a value which allows the system to be reinitialized)
a wait of a few milliseconds
the last retry round.

If it has not been possible to retry the instruction after all these rounds, an exception report is made to the software and the current process is suspended.

This mechanism is brought into action when it has been found that the operation during which the error occured can be retried.

The possibility of such a retry is verified in the first word of the process CJP currently being executed. The instruction can only be retried if the automatic retry bit is at binary 1. Otherwise the operation cannot be repeated and an exception is generated.

There are two retry counters which are located in the central memory at BAR + (36) 16 and BAR + (37) 16 respectively. The number of retries permitted is defined at system level and two rounds of retries can be made.

The mechanism of the rounds is as follows. The two counters are initialized by the software by means of a "RESET RETRY COUNT" instruction. Before each retry, the appropriate counter is decremented by 1 and when the counter is at zero, before the next retry:

if FRB = 0 the end of the first retry round has been reached. Another round may be started and before this second round the microprogram waits for a few milliseconds so as to avoid intermittent errors. This wait is achieved by using a loop consisting of two microprogram lines.

At the end of this delay, the initial retry count is at address BAR + (36) 16 and is fed to the next address BAR + (37) 16 and becomes the new, current retry count.

when FRB = 1 (end of the second retry round) an unsuccessful retry exception is generated.

A bit SFRM is contained in SP 06 and when it is at zero indicates that the software has been informed via the request handler 5 that the retry has been successful. This information is drawn up by the error handler using bits SER and SRT.

SFR is a bistable in PMU (FIG. 1)
SFR = 1 generates a system checking request:
SRT (which is contained in SP 06) indicates to the request handler, when at logic 1, that a successful retry exception should be generated. Before repeating an instruction in the course of which an error has occurred, registers, flip-flops and certain bit locations need to be initialized or reinitialized.

EXST (machine error state). Bistable PMU needs to be reset to zero to prevent the system being inhibited in the event of a hardware error in the course of the retry.

Figure 6:
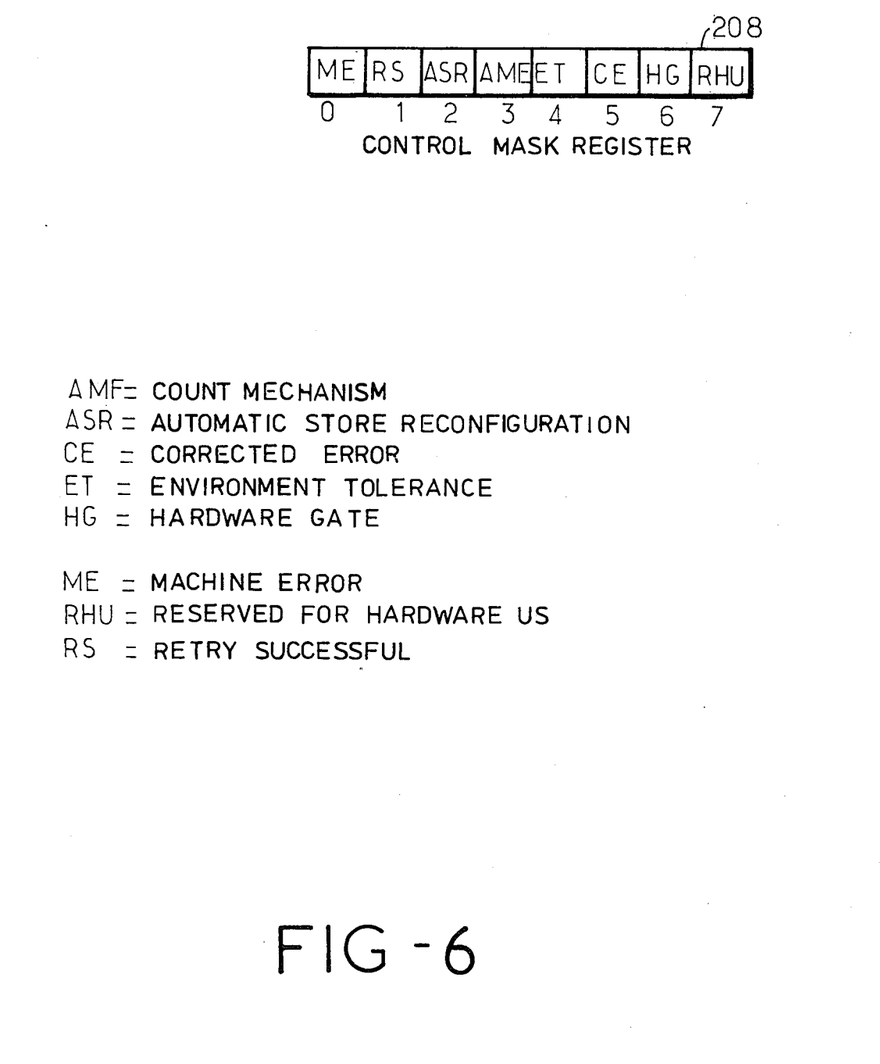
FIG. 6 is a diagram of the hardware control mask register.

SCMK (system controller mask) (208 FIG. 6). This bistable which is contained in the PMU, needs to be set to 1, that is to say all the requests from the system controller need to be masked.

The reason is as follows: The retry of an instruction begins with microinstruction E$\phi$P. The report of a successful retry needs to be given at the end of this microinstruction, i.e., at the second E$\phi$P. Consequently, requests from the system controller need to be masked during the first E$\phi$P.

The name of the process in course of execution is found at address BAR + (38) 16 and is stored under BAR at address 50 (16).

This word will be read in the event of a successful retry. This name needs to be stored before the retry since the process may be changed before a report is given on the retry.

If the decor extension number DEXT is other than zero the process is executed in the extended mode. Control needs to be handed back to the emulator before an instruction is retried. The following parameters are sent to the emulator:

(MD) 3 = 0 (SP 01) 0:8 = DEXT (SP 10) 0:8 = 06

(SP 11) 8:8 = A3 segment base
(SP 11) 16:16 which is the address to which the emulator needs to return if it decides not to retry the instruction and to generate a special exception termed the "operation cannot be retried" exception.

The device for measuring the process time (PROCESS TIMER) needs to be set going before the retry since if SFRM is at 1, the request handler (5, FIG. 2) will not be called in and consequently the timer will not be actuated.

To carry out a retry, a branch is made to the request handler which has the following effects: MRB is reset to zero except in the case of the hardware gate HG the state of which is not altered. The process timer is set going and the instruction contained in register IC is begun.

A retry may be carried out in the dispatcher 3 in FIG. 2 (resetting of the registers).

As was seen above, a certain number of exceptions are generated in the course of processing errors. During operations by the hardware error handler HEH 6 (FIG. 2) the following exceptions may be detected:

operation cannot be retried (with a CPU error)
operation cannot be retried (with an MMU error)
unsuccessful retry (with a CPU error)
unsuccessful retry (with an MMU error)

As previously stated, the origin of the error (CPU or MMU) is found by analyzing bits 5 and 7 in register ER.

A certain number of preliminary handling operations are required before calling up the exception handler 2.

Certain errors are due to intermittant faults which may be corrected after a certain time. To this end, the microprogram is looped for two lines as described above.

At the end of this delay, a fault register (FB) and a channel command entry absolutizing register (ACCE) need to be reset to zero.

Register FB is only fully significant when used with the process incident handler 7 (FIG. 2).

ACCE is used to prevent the exception handler 2 from altering the nature of the exception.

Figure 4A:
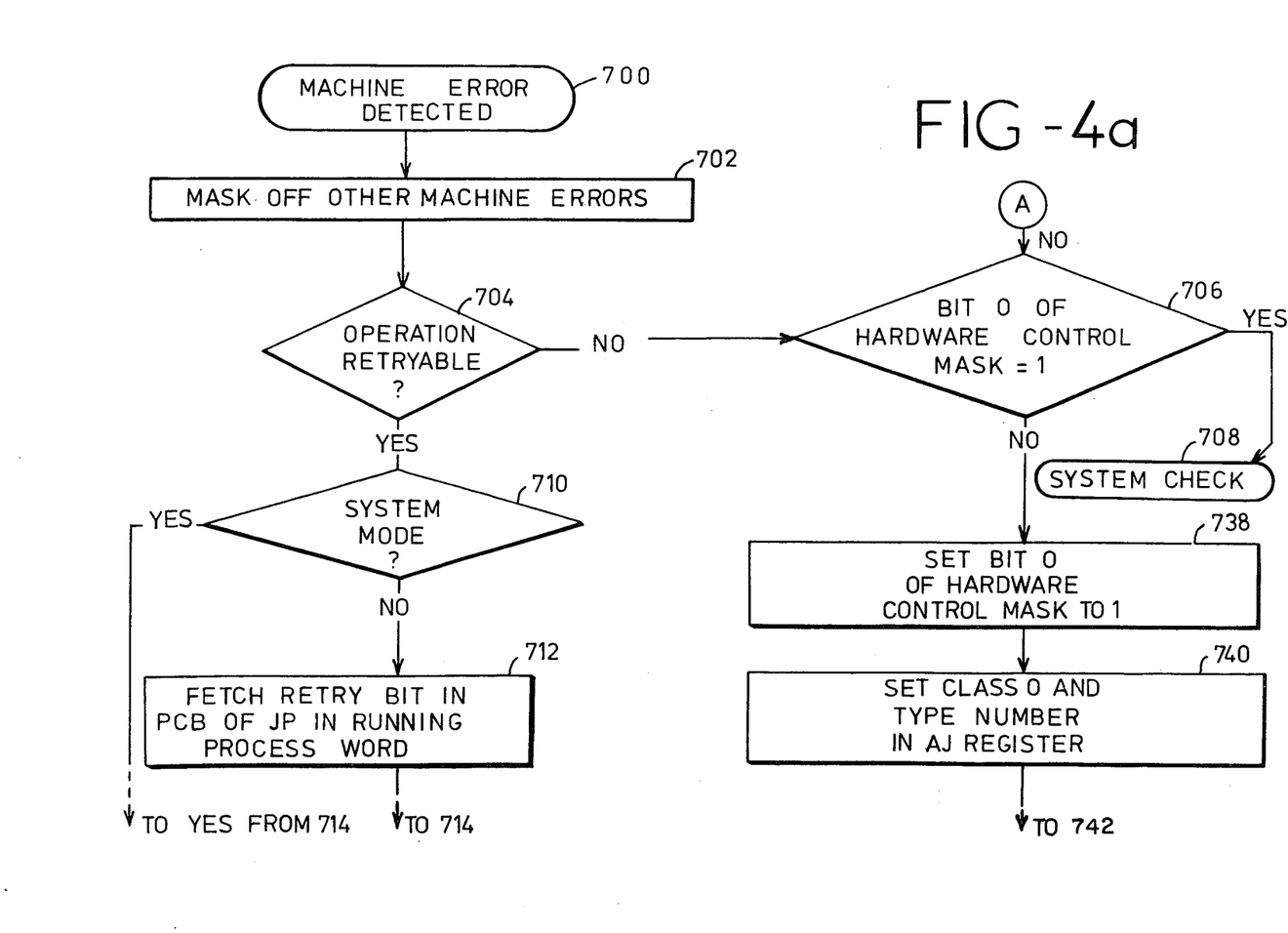
FIGS. 4a, 4b and 4c form a flow-chart of the operations which are carried out in the course of the error-handling trap.
Figure 4B:
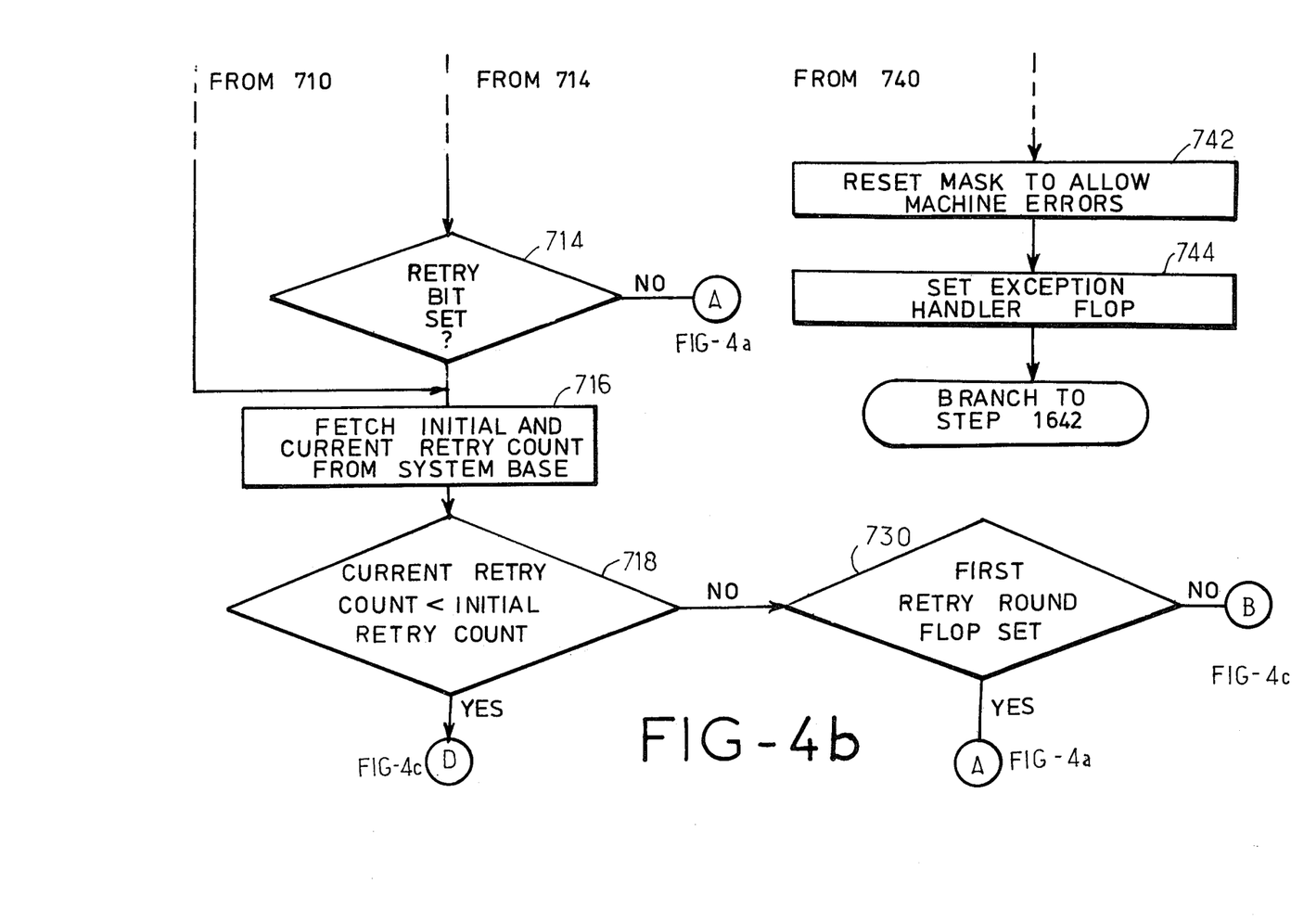
Figure 4C:
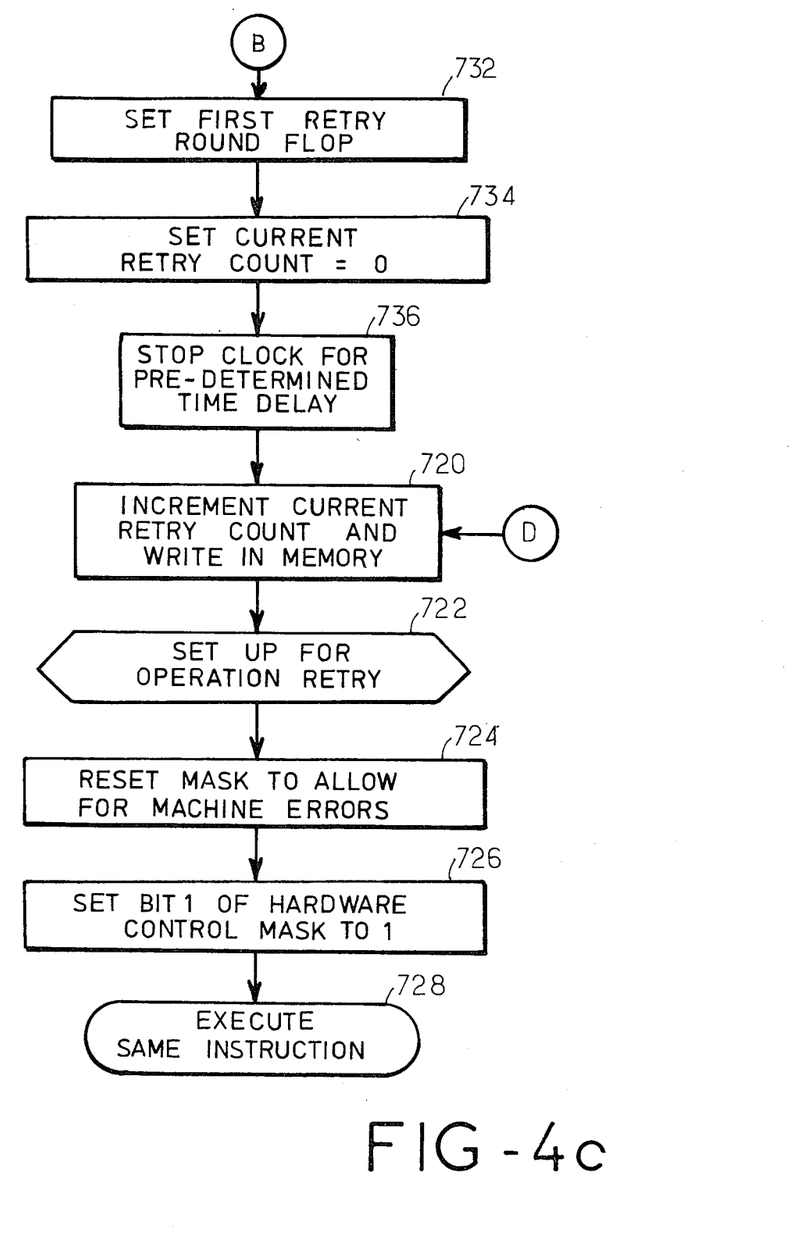

The machine error mechanism (shown in FIG. 4, operation 702) masks other machine errors after an error has been detected at 700. Consequently, if other checks indicate that other hardware errors have occurred, they are ignored temporarily as it has been noticed that machine errors tend to repeat. If there were no mask, there would be a danger of entering an endless loop, which is undesirable. FIG. 4 shows operations in the course of a microsoftware trap. Thus, in actual fact, hardware errors are masked while the machine error mechanism is operating. Machine errors are masked until the moment when instructions are effectively retried or the moment when the entire machine goes into the error state.

Operation 704 asks whether the operation can or cannot be retried. In general terms all instructions enter certain data, carry out certain calculations in the working registers of the auxiliary store SPU without altering the content of main memory cells or of general registers. Subsequently, the instruction will alter the content of certain general registers or storage cells, possibly at the same time as it carries out additional calculating of checking operations. Before the alterations are made, the instruction is said to be in its initial phase. If an exception is detected during the initial phase of an instruction, the instruction may be looked upon as not having been executed, and it may be re-executed once the cause of the error has been removed. If an error is detected once an instruction has altered the general registers or main memory, the instruction may not be considered as re-executable but rather as interrupted.

In operation 704, a retry bit in the process control block PCB is tested. In the case of machine errors, a retry which takes place during an operation particular to a process is under the control of a retry bit from an octet of the process control block for the running process. When the retry bit is zero, all machine errors are treated as if they could not be the subject of a retry. Also, no retry wil be attempted if the processor is already in the machine error state, or in other words if the first bit ME in the machine control register (FIG. 6) is at 1.

Thus, when the retry limit is reached, or in other words when the registers have been altered, the retry bit in the process control block assumes the value binary 0, and thus validates a branch to operation 706 in which bit 0 of the hardware control mask is tested. If this bit is equal to 1, this means that the system is in the machine error state. This occurs when the central processor has detected a machine error which cannot be the subject of a retry, or else in the event of machine error, has attempted an unsuccessful retry, before activating the central exception mechanism. Thus, if the operation cannot be the subject of a retry, the machine has already gone to the machine error state with the object of preventing a second machine error which might hinder the success of the correction. In the case where a second machine error occurs before the correction has effectively been made, the system alert state 708 arises.

However, where the operation may be the subject of a retry, operation 710 is carried out to test the system mode flip-flop to determine whether a system control operation was or was not in course of execution. If a hardware error has occurred in the process mode, the machine error mechanism confines itself solely to the process which was in course of execution and in which the machine error occurred. Nevertheless, if a system control operation is in course of execution, the error cannot be considered as confined solely to the process mode and is held to constitute a system error. If there is no system control operation going on, operation 712 is used to extract the current process word from the system base at BAR + 56. In a system to which the invention is applicable, the full status of the system is contained in a special area of the central memory termed the system base which contains inter alia a word RPW which defines the process presently running. U.S. patent application Ser. No. 528,951 for "A system base"). In this running process word appears the logic name JP of the running process. This name JP is used to fetch the PCB block for this process and thus its retry bit which, in operation 714 (FIG. 4b), is tested to determine whether or not it has been set. If a diagnostic microprogram error is the subject of a check by the system monitor, this retry bit is not set since otherwise it would introduce an error into the system. Thus, the retry bit will normally be at 1 and operation 716 will be executed. This operation is also carried out if a system control operation was in course of execution.

In the course of operation 716, the initial retry count and the current retry count, which are stored in the system base at BAR + 52, are transferred to the arithmetic and logic unit ALU (FIG. 1). The initial number has a predetermined value fixed for it which corresponds to the number of retries made in the case of machine errors. These numbers are stored in working register in the arithmetic and logic unit.

In operation 718, the current retry count is compared with the initial retry count. The current retry count is either the same as the intial retry count or less than it, depending on the number of times the instruction has been re-executed. If the current retry count is less than the initial retry count, a branch is made to operation 720 (FIG. 4c). This will normally take place on the occasion of the first re-execution of the instruction. In operation 720, the current retry count is increased by one unit in the arithmetic and logic unit and retransferred to the memory zone for the system base.

In operation 722, the operations needed to return the instruction to its initial state are carried out. These operations depend on how far the execution of the instruction has progressed and are known. Then, the mask which was set in operation 702 is reset in operation 724, which allows additional machine errors in the system to be detected. In operation 726, the operation retry bit, which is bit one of the hardware control mask, is set to the binary 1 value to indicate to the system that the instruction was not executed normally when first tried. Given that from this point on, the instruction is ready to be carried out and that the machine error mechanism has recorded the appropriate parameters, operation 728 hands control back from the machine error mechanism to the same instruction.

However, if when the instruction is re-executed another error or the same error is detected, operation 700 will be carried out again. Where the operation is able to form the subject of a retry, the sequence of stages described above will be carried out as far as stage 718.

At operation 718, it is now possible for the current retry count to be equal to the initial retry count, and a branch is therefore made to operation 730, to check whether flip-flop in the auxiliary store SPU is set. The flip-flop concerned is the flip-flop for the first round of retries which indicates that the retry round has been completed. In the case of machine errors, a set of two rounds of retries is always attempted by the retry mechanism. If the first round of retries fails, the retry round flip-flop is set at 732 and at 734 the current retry count is reset to zero for the second round of retries.

At operation 736, a delay of fixed duration, related to the type of system, commences during which the central processor is no longer available for normal processing, this delay being of the order of three milliseconds. At the end of this delay, the second round of retries begins in the same way as was described above for operations 720 to 726 (FIG. 4c).

If at the conclusion of the second round of retries the operation still has not succeeded, or in other words if a machine error has been detected, the central exception mechanism will receive the appropriate parameters mentioned with reference to FIG. 1. This is shown at operation 730 by the reply YES and the branch to operation 706 (FIG. 4a). At 706 the hardware control mask will be tested to determine whether or not the machine is in the error state. If the answer is YES, the system error state goes to 708. The answer will however normally be NO and consequently operation 738 will be carried out, the effect of which will be to set bit 0 of the hardware control mask 208 to the binary 1 value. This operation will also be carried out in the event of an error which cannot form the subject of a retry being detected, when the hardware control mask is different from 1.

In operation 740, register AJ of the arithmetic and logic unit will receive the error class 0 and a type number indicating the type of exception detected. At this point the machine exception mechanism prepares the central exception mechanism to receive the relevant parameters.

In operation 742, the mask which was set at operation 702 will be reset, which will allow other machine errors to be detected.

In operation 744, the exception handling flip-flop will be set to indicate that the central exception mechanism has been actuated and then a branch will be made to operation 642 to bring about a system exception. These circumstances will give rise to access to the system base at system exception cell 0, which indicates a semaphore at which is waiting a process which is ready to deal with the type of hardware error which has occurred, namely machine error 0.

Thus, when a retry made in the event of a machine error fails, the central processor goes to the machine error state (in other words bit 0 of the hardware control mask assumes the binary 1 value) and the central exception mechanism is actuated directly, which causes the appropriate class 0 exception to be generated. Retrying an operation is only held not to have succeeded when two rounds of retries have been carried out. The central exception mechanism then acts upon the error in the course of the second phase of execution as dictated by the report made by the machine error mechanism. What it does was described above with reference to FIG. 3.

What is claimed is:

1. In a data processing system comprising a central processor including functional devices capable of executing instructions stored in a memory, and means for detecting errors, improved apparatus for handling the detected error, comprising:
    a first register having a plurality of bit locations, each of said functional devices being connected to one of said bit locations so as to permit the location and detection of errors; and
    a second register operatively connected to selected of said functional devices, which are subject to several types of error for determining in which of said functional devices the detected error has occurred.

2. Apparatus according to claim 1, further comprising a control mask register including first binary means for indicating whether said central processor is in a machine error state, second binary means for indicating whether the detected error has been corrected, and gate means for allowing said system to be locked by indicating whether the detected error was detected while said central processor was in a transistory mode.

3. Apparatus according to claim 1, further comprising:
    means responsive to a detected hardware error for locking said first register so that other errors will be masked, and
    means responsive to the type of error detected for inhibiting said central processor until at least one of the following events has occurred: a diagnostic processor has been actuated, isolated routine tests are carried out, or the detected error is ignored.

* * * * *